(12) United States Patent
Liu

(10) Patent No.: US 11,246,394 B2
(45) Date of Patent: Feb. 15, 2022

(54) ENVIRONMENTALLY FRIENDLY LIPSTICK TUBE

(71) Applicant: Ting Nan Liu, New Taipei (TW)

(72) Inventor: Ting Nan Liu, New Taipei (TW)

(73) Assignee: Zhuhai Ding Rong Plastic Products Co., LTD, Zhuhai (CN)

( * ) Notice: Subject to any disclaimer, the term of this patent is extended or adjusted under 35 U.S.C. 154(b) by 45 days.

(21) Appl. No.: 16/572,827

(22) Filed: Sep. 17, 2019

(65) Prior Publication Data

US 2021/0076801 A1    Mar. 18, 2021

(51) Int. Cl.
*B43K 21/08* (2006.01)
*A45D 40/06* (2006.01)
*C08L 67/02* (2006.01)

(52) U.S. Cl.
CPC ............. *A45D 40/06* (2013.01); *C08L 67/02* (2013.01)

(58) Field of Classification Search
CPC ................. A45D 40/06; A45D 40/065; A45D 2040/208; A45D 2040/0062
USPC ..................................................... 401/77, 78
See application file for complete search history.

(56) References Cited

U.S. PATENT DOCUMENTS

| | | | | | |
|---|---|---|---|---|---|
| 5,899,620 | A | * | 5/1999 | Pierpont | A45D 40/06 401/78 |
| 5,988,917 | A | * | 11/1999 | Sheffler | A45D 40/06 401/68 |
| 6,200,049 | B1 | * | 3/2001 | Pinhel | A45D 40/06 401/63 |
| 7,144,171 | B2 | * | 12/2006 | Blondeel | A45D 40/00 401/77 |
| 11,064,787 | B2 | * | 7/2021 | Liu | A45D 40/06 |
| 2007/0217857 | A1 | * | 9/2007 | Ho | A45D 40/06 401/88 |
| 2020/0288845 | A1 | * | 9/2020 | Maurin | A45D 40/04 |

* cited by examiner

*Primary Examiner* — Jennifer C Chiang

(57) ABSTRACT

An environmentally friendly lipstick tube formed of PET includes a rotation tube, an ascending and descending tube, and a support tube. The rotation tube includes spiral guide grooves on an inner surface. The ascending and descending tube includes two opposite guide pins on an outer surface, and parallel longitudinal ribs on an inner surface, and a support surface adjacent to a bottom edge. The support tube includes two opposite longitudinal tunnels on a surface, each longitudinal tunnel having an upper horizontal end and a lower horizontal end. The rotation tube is put on the support tube. The ascending and descending tube is in the support tube. The guide pins are moveably disposed through the longitudinal tunnels into the spiral guide grooves and the guide pins are anchored in the upper horizontal ends or the lower horizontal ends at an end of the movement.

4 Claims, 5 Drawing Sheets

ENVIRONMENTALLY FRIENDLY LIPSTICK TUBE

BACKGROUND OF THE INVENTION

1. Field of the Invention

The invention relates to lipstick tubes and more particularly to an environmentally friendly lipstick tube formed of polyethylene terephthalate (PET) which is used in containers for foods.

2. Description of Related Art

A conventional lipstick tube includes a holder for loading a lipstick and a rotation body for ascending or descending the holder. The holder includes a casing, a base, an intermediate part, and a core. The holder is made of polyoxymethylene (POM) and acrylonitrile butadiene styrene (ABS) resin.

However, assembly of the holder is difficult due to its multiple parts. Further, production is low. POM is white, ABS resin is yellow, and color of the holder is limited to one. To change the color of the holder, it is required to add other dyes of different colors to cover colors of both POM and ABS resin in the process of manufacturing the holder. This not only increases the manufacturing cost but also makes it impossible to make the color of the holder to be a specific color.

Further, stability of the molecules of both POM and ABS resin is poor. Their chemical resistance is poor, i.e., being less resistant to both weak acid and strong acid. Furthermore, smell can be generated in the manufacturing process due to formaldehyde. In addition, its shaping speed is very low and its materials are not environmentally friendly and are non-recyclable.

Different materials are used in manufacturing parts of lipstick tube. Next, these parts assembled by means of ultrasonic waves. Unfortunately, it is not easy to disassemble the lipstick tube after use because other plastics are added to the lipstick tube in the manufacturing process. This adds great difficulties to recycling.

Thus, the need for improvement still exists.

SUMMARY OF THE INVENTION

It is therefore one object of the invention to provide an environmentally friendly lipstick tube comprising a rotation tube formed of PET; an ascending and descending tube formed of PET; and a support tube formed of PET; wherein the rotation tube is hollow and includes a plurality of spiral guide grooves formed on an inner surface; wherein the ascending and descending tube includes two opposite guide pins formed on an outer surface, a plurality of parallel longitudinal ribs formed on an inner surface, a support surface being adjacent to a bottom edge and under the parallel longitudinal ribs, and a plurality of holes disposed through the support surface; wherein the support tube is hollow and includes two opposite longitudinal tunnels formed on a surface, each of the longitudinal tunnels having an upper horizontal end and a lower horizontal end oriented in a direction opposite to that of the upper horizontal end; wherein the rotation tube is put on the support tube; wherein the ascending and descending tube is disposed within the support tube; and wherein the guide pins are moveably disposed through the longitudinal tunnels into the spiral guide grooves and the guide pins are anchored in the upper horizontal ends or the lower horizontal ends at an end of the movement.

The invention has the following advantages and benefits in comparison with the conventional art:

It is recyclable. The lipstick tube is completely made of PET which is used in containers for foods. The lipstick tube can be recycled after use and the recycled material can be used in manufacturing new products. This can achieve environmental sustainability by reducing pollution.

It decreases the manufacturing cost. The lipstick tube is completely made of PET which is used in containers for foods. PET is transparent in nature. Thus, the lipstick tube can be made colorless or any of other colors in the manufacturing process. It greatly decreases the consumption dye materials in the manufacturing process. It is not required to change the original color of the material. Therefore, it is possible of decreasing the manufacturing cost.

Shaping speed is very quick. There is no smell in the manufacturing process. Stability of the molecules of PET is high and its chemical resistance is high because the lipstick tube is completely made of PET which is used in containers for foods. Its manufacturing time is decreased about 50% in comparison with the conventional art, thereby greatly increasing the manufacturing efficiency, decreasing the energy consumption, and lowering greenhouse emissions. The recycled material can be used in manufacturing new products.

Assembly is simple. Only the rotation tube, the ascending and descending tube, and the support tube are assembled prior to ascending or descending the lipstick. The number of the components is much less than that of the conventional lipstick tube.

The above and other objects, features and advantages of the invention will become apparent from the following detailed description taken with the accompanying drawings.

DETAILED DESCRIPTION OF THE INVENTION

Figure 1:
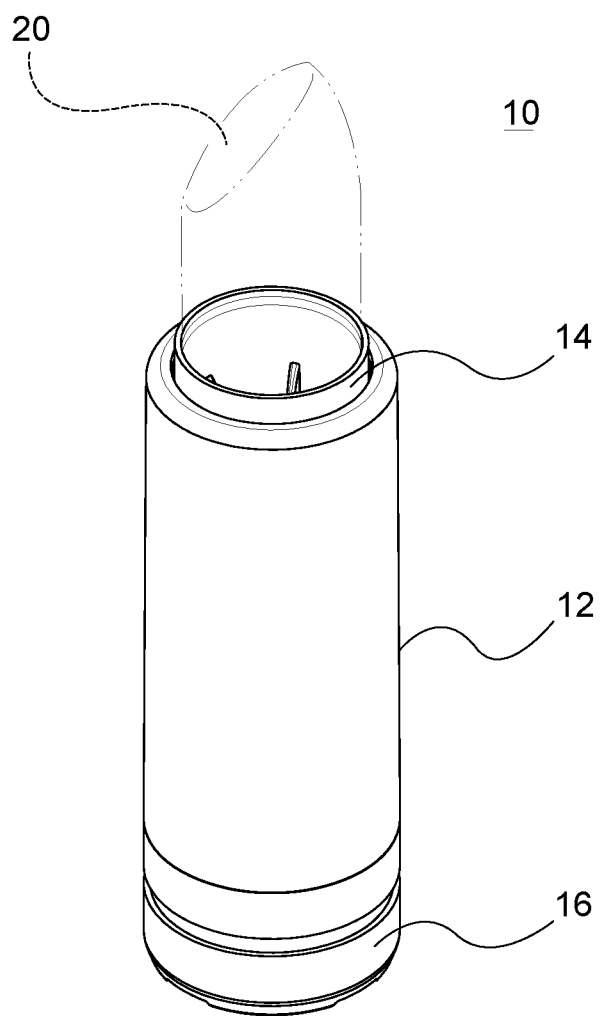
FIG. 1 is a perspective view of an environmentally friendly lipstick tube according to the invention.

Referring to FIG. 1, an environmentally friendly lipstick tube 10 in accordance with the invention is shown. The lipstick tube 10 is formed of PET and comprises a rotation tube 12, an ascending and descending tube 14, and a support tube 16. The ascending and descending tube 14 is loaded with a lipstick 20. A person may hold the support tube 16 with one hand and rotate the rotation tube 12 with the other hand. As a result, the ascending and descending tube 14 moves upward to lift the lipstick 20 or downward to lower the lipstick 20.

Figure 2:
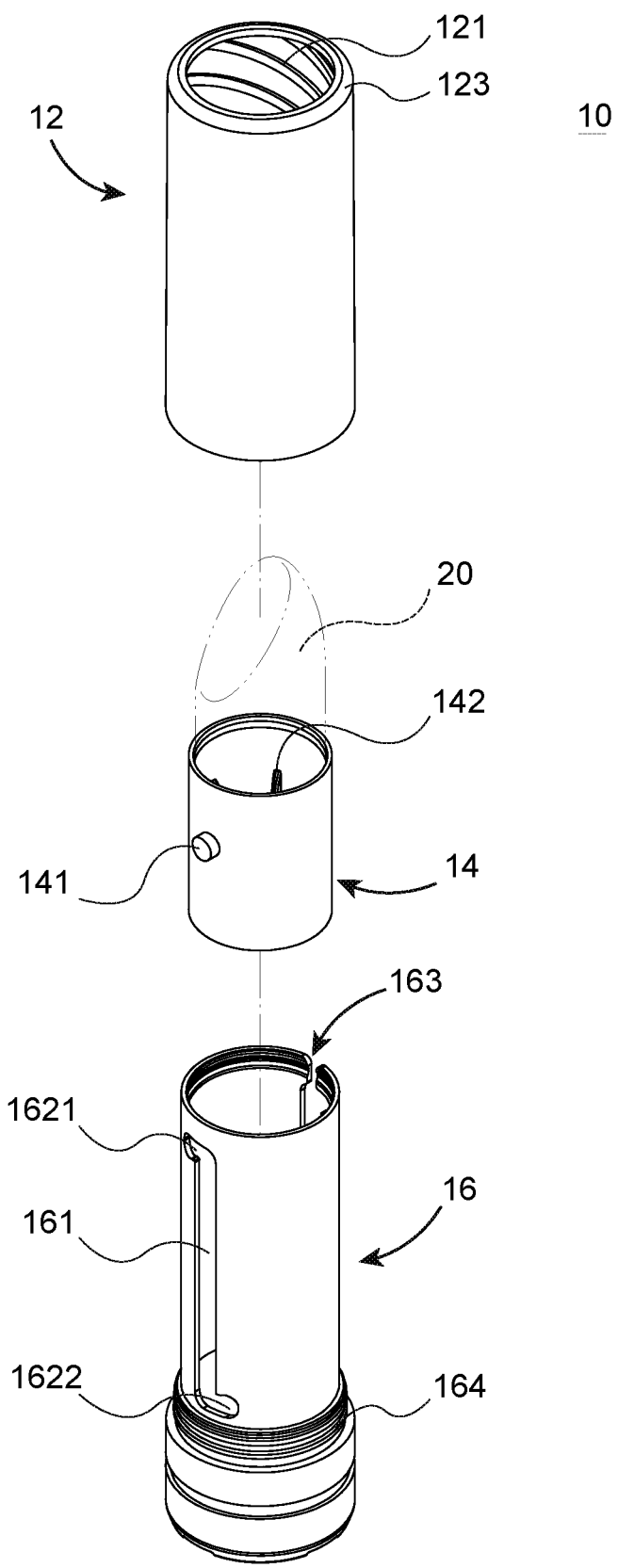
FIG. 2 is an exploded view of FIG. 1.

Referring to FIG. 2, the rotation tube 12 is hollow and includes a plurality of spiral guide grooves 121 on an inner surface. The ascending and descending tube 14 includes two opposite cylindrical guide pins 141 on an outer surface, and a plurality of parallel longitudinal ribs 142 on an inner surface for fastening the lipstick 20. The support tube 16 is hollow and includes two opposite longitudinal tunnels 161 on a cylindrical surface, each of the longitudinal tunnels 161 having an upper horizontal end 1621 and a lower horizontal end 1622 oriented in a direction opposite to that of the upper horizontal end 1621. The rotation tube 12 is put on the support tube 16. The ascending and descending tube 14 is disposed within the support tube 16. The cylindrical guide pins 141 are moveably disposed through the longitudinal tunnels 161 into the guide grooves 121. The cylindrical guide pins 141 are anchored in the upper horizontal ends 1621 or the lower horizontal ends 1622 at the end of the movement.

Referring to FIG. 2 again, the support tube 16 further comprises a longitudinal cut 163 through a top edge and communicating with one of the upper horizontal ends 1621. The longitudinal cut 163 has a width less than a diameter of the cylindrical guide pin 141. The provision of the longitudinal cut 163 prevents the support tube 16 from being damaged by thermal expansion in addition to facilitate the movements of the cylindrical guide pins 141 through the longitudinal tunnels 161. The rotation tube 12 further comprises a curved top edge 123 to prevent an individual from being hurt when applying the lipstick 20.

Figure 3:
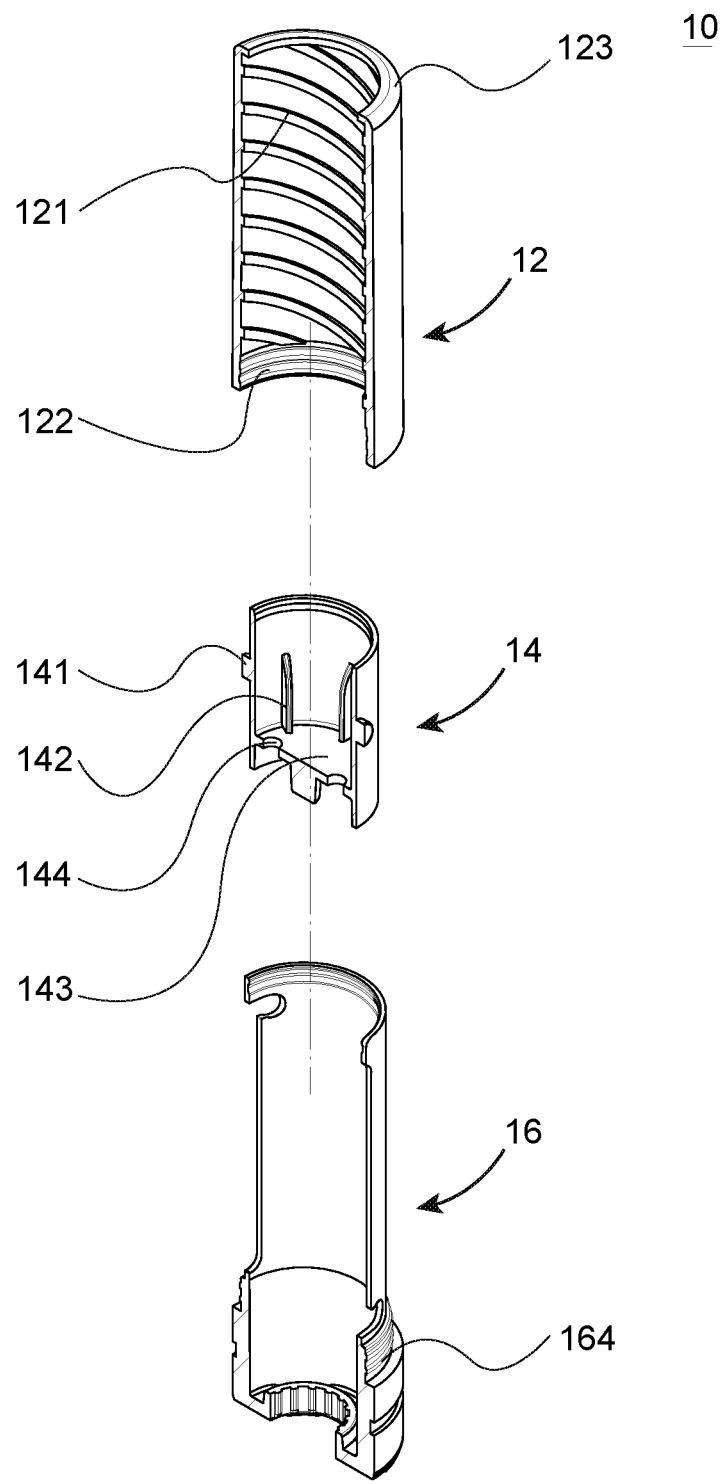
FIG. 3 is a longitudinal sectional view of FIG. 2.

Referring to FIG. 3, the guide grooves 121 are spirally formed on the inner surface of the rotation tube 12. The rotation tube 12 further comprises two parallel annular troughs 122 on the inner surface proximate a bottom edge. The support tube 16 further comprises two parallel annular ridges 164 configured to dispose in the annular troughs 122 when the rotation tube 12 is put on the support tube 16. The provision of the annular ridges 164 and the annular troughs 122 enhances a joining strength of the rotation tube 12 and the support tube 16.

Figure 4:
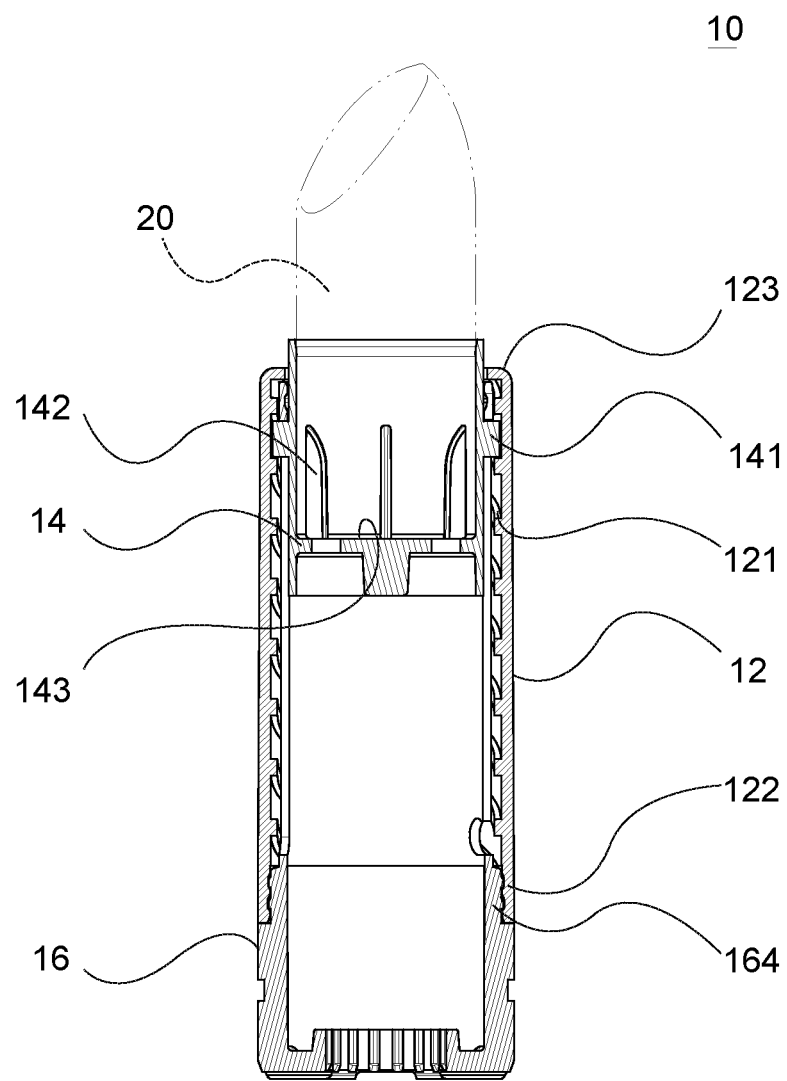
FIG. 4 is a longitudinal sectional view of FIG. 1.

Referring to FIG. 4 in conjunction with FIG. 3, the ascending and descending tube 14 further comprises a support surface 143 adjacent to a bottom edge and under the ribs 142, the support surface 143 being configured to support the lipstick 20, and a plurality of holes 144 through the support surface 143 for facilitating the upward or downward movement of the ascending and descending tube 14.

Figure 5:
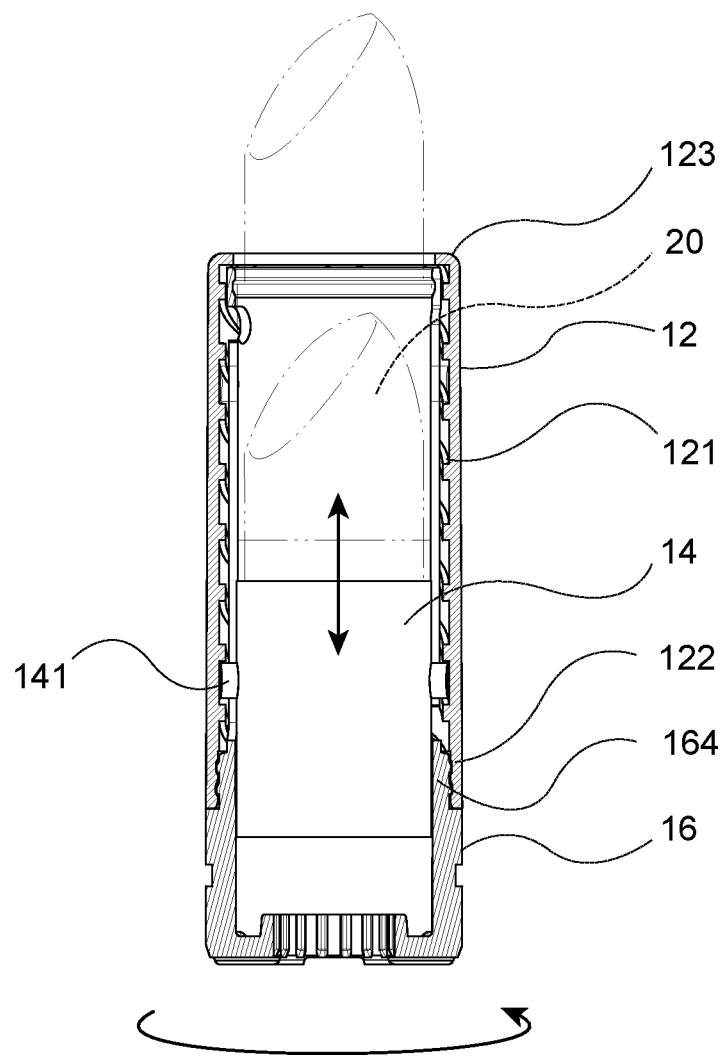
FIG. 5 is a view similar to FIG. 4 showing an ascending or descending movement of the ascending and descending tube by rotating the rotation tube.

Referring to FIG. 5, an individual may hold the support tube 16 with one hand and rotate the rotation tube 12 with the other hand. As a result, the ascending and descending tube 14 moves upward to lift the lipstick 20 or downward to lower the lipstick 20 by moving the guide pins 141 along the spiral guide grooves 121.

While the invention has been described in terms of preferred embodiments, those skilled in the art will recognize that the invention can be practiced with modifications within the spirit and scope of the appended claims.

What is claimed is:

1. An environmentally friendly lipstick tube, comprising:
  a rotation tube formed of polyethylene terephthalate (PET);
  an ascending and descending tube formed of PET; and
  a support tube formed of PET;
  wherein the rotation tube is hollow and includes at least seven parallel spiral guide grooves equally spaced on an inner surface;
  wherein the ascending and descending tube includes two opposite guide pins formed on an outer surface, a plurality of parallel longitudinal ribs formed on an inner surface, a support surface being adjacent to a bottom edge and under the parallel longitudinal ribs, and a plurality of holes disposed through the support surface;
  wherein the support tube is hollow and includes two opposite longitudinal tunnels formed on a surface, each of the longitudinal tunnels having an upper horizontal end and a lower horizontal end oriented in a direction opposite to that of the upper horizontal end;
  wherein the rotation tube is put on the support tube;
  wherein the ascending and descending tube is disposed within the support tube; and
  wherein the guide pins are moveably disposed through the longitudinal tunnels into the spiral guide grooves and the guide pins are anchored in the upper horizontal ends or the lower horizontal ends at an end of the movement; and
  wherein the support tube further comprises a longitudinal cut through a top edge and communicating with one of the upper horizontal ends, the longitudinal cut having a width less than a diameter of the guide pin from the top edge to the one of the upper horizontal end.

2. The environmentally friendly lipstick tube of claim 1, wherein the rotation tube further comprises at least one annular trough formed on the inner surface proximate a bottom edge, and the support tube further comprises at least one annular ridge configured to dispose in the annular trough when the rotation tube is put on the support tube.

3. The environmentally friendly lipstick tube of claim 1, further comprising a lipstick fastened by the parallel longitudinal ribs of the ascending and descending tube and supported by the support surface.

4. The environmentally friendly lipstick tube of claim 1, wherein the rotation tube further comprises a curved top edge.

* * * * *